Patented Nov. 14, 1950

2,529,670

UNITED STATES PATENT OFFICE 2,529,670

SWEETENING GASOLINE

George W. Ayers, Chicago, Ill., and Erskine E. Harton, Laramie, Wyo., assignors to The Pure Oil Company, Chicago, Ill., a corporation of Ohio No Drawing. Application July 31, 1948,
Serial No. 41,893

6 Claims. (Cl. 196—29)

This invention relates to a process of sweetening hydrocarbon liquids in which obnoxious sulfur compounds occurring in the liquids are oxidized to unobjectionable form without the development of color bodies in the hydrocarbon.

It is well known that sour gasoline or other sour hydrocarbon liquids can be sweetened by agitating the liquid with air or oxygen in the presence of an alkaline solution of certain quinones and phenols. One of the operational difficulties which develops in the practice of such processes is the formation of color bodies in the gasoline or hydrocarbon liquid which is being sweetened. It seems that the material used as the catalyst forms the color body, or at least aids in the formation thereof, and is slowly carried off in solution in the hydrocarbon. Thus, a double disadvantage results to a certain extent, for catalyst is lost in proportion to the color deterioration of the product. Although the product is sweet and satisfactory for technical uses, it has sufficient undesirable color to require additional processing.

Accordingly, it is a fundamental object of this invention to provide a process for the alkaline sweetening of hydrocarbon liquids by an aeration process which will result in the production of a sweet hydrocarbon in which color deterioration has been held to a minimum or eliminated.

It is a second object of this invention to provide a novel alkaline solution to be used in the aeration sweetening of hydrocarbon liquids.

A further object of the invention is to provide a method of preparing doctor sweet hydrocarbons in a manner which will avoid the formation of foreign color bodies.

Other objects and advantages of the invention will in part be obvious and in part appear hereinafter.

This invention, accordingly, comprises a process for the sweetening of hydrocarbon liquids wherein the liquid is aerated while in contact with a treating solution by agitating the two in a vessel or tower, and after thorough contact, the mixture is allowed to stratify to permit separation of the product.

The alkaline treating solution is preferably a rather strongly alkaline aqueous solution containing about 5 to 40 per cent of sodium hydroxide, and about 0.5 to 5 per cent of a catalyst for accelerating the oxidation of the obnoxious sulfur compounds, which catalyst is preferably a sulfonated hard wood tar or other substance containing active ingredients like those in the hard wood tar. The sulfonation of the hard wood tar can be carried to the point of mono-, di- or higher sulfonation, but inasmuch as satisfactory results are obtained with monosulfonates, the economics of the process indicates that greater sulfonation need not be adopted. Catalytic materials include sulfonates of various tannins and hard wood tars. Particularly effective among these are sulfonates of such hard wood tars as those known commercially as U. O. P. Inhibitor No. 1 and I Tar Oil. U. O. P. Inhibitor No. 1 is the commercial designation of a hard wood tar boiling between about 240° and 300° C. and sold by the Universal Oil Products Company as a gasoline antioxidant. I Tar Oil is a settled hard wood tar sold by the Tennessee Products Company. For the method for producing the settled tars, reference should be had to the article entitled "New Products from Wood Carbonization" by A. W. Goos and A. A. Reiter of the Cliffs Dow Chemical Company, Marquette, Michigan, which appeared in the February 1946, issue of The Journal of Industrial and Engineering Chemistry, pages 132 to 135, inclusive. Commercial wood tar will usually contain about 5 per cent by weight of black solid material. For purposes of this application, the black solid material is called "Wood Tar Solids" and the liquid filtrate is called "Wood Tar Filtrate."

Certain hydroxy aromatic compounds are also useful as oxidation catalysts and are converted to more easily used form by sulfonation, for thereby their solubility in aqueous solution is increased and their tendency to discolor treated hydrocarbon liquid is reduced. The catalysts of this type are preferably sulfonated aromatic compounds containing a benzene, naphthalene or anthracene ring with at least two hydroxy groups attached thereto in positions ortho or para to each other so that the compound is oxidizable to the quinone form and, also, compounds which in addition have one or more alkoxy group substituted for hydrogen in the aromatic ring, the compounds being sulfonated in the aromatic ring to mono-, di-, or polysulfonates. As examples of specific compounds, the sulfonates of which are effective oxidation promoters, there may be mentioned naphthoquinone, hydroquinone, anthraquinone, and various alkyl, aromatic and alkoxy derivatives thereof, all of which are sulfonated to at least the mono form.

We have found in the sweetening of hydrocarbon liquids employing caustic alkali solutions containing catalysts such as those mentioned, that in addition to the advantage obtained by the avoidance of color deterioration of the hydrocarbon liquid in the operation, the process has an economic advantage because loss of catalyst is minimized, or, retention of the catalyst activity in the aqueous caustic solution is substantially better than with the ordinary type solution. This apparently is a result of improved solubility of the sulfonated catalyst materials in the aqueous solution and reduced solubility in the hydrocarbon mixture.

For process operations carried out in accordance with the invention, hydrocarbon and treating solution in proper proportions are mixed together and, after agitation and a given period of residence in a tower or treating vessel, which will be determined by the design and dimensions of the apparatus, the hydrocarbon liquid and the caustic treating solution are allowed to stratify. The hydrocarbon is taken from the top of the tower and passed to a washing and recovery system, whereas the caustic treating solution is conducted from the bottom of the tower and passed to a stratifier for separating such hydrocarbon as may have been included and to treating and recovery apparatus where it is purged and adjusted in composition for recycling in the process.

The preparation of the sulfonates used as catalysts follows substantially traditional lines and will be illustrated by several examples.

Various methods of sulfonation can be used, but in developing the method, in particular the sulfonation of wood tar, consideration must be given to the fact that extremely high concentrations of sulfuric acid will cause carbonization of some of the organic matter in the wood tar. We have found that sulfonation is best carried out at temperatures slightly above room temperature with fuming sulfuric acid.

*Example I.*—A mixture of 10 grams settled wood tar, 40 milliliters of 95 per cent sulfuric acid and 40 milliliters of 15 per cent fuming sulfuric acid was heated in a 100 milliliter round bottom flask at 122° F., for approximately three hours. After the mixture had cooled, it was poured into about eight volumes of distilled water. The solution was heated almost to boiling, while solid barium carbonate was added in excess. As soon as the precipitate began to settle, the mixture was filtered with suction and the precipitate was washed with one liter of water. The filtrate and wash were combined and treated with slightly more than enough sodium carbonate solution to precipitate all of the barium as barium carbonate. After removal of the barium carbonate by filtration, the filtrate was extracted several times with ether and then evaporated to dryness, yielding the sodium wood tar sulfonate as a brownish solid.

*Example II.*—Two grams of settled wood tar was sulfonated directly with 1.7 milliliters of chlorosulfonic acid, the mixture being cooled in ice-water during addition of the chlorosulfonic acid. Then 20 milliliters of water was added, and the cold mixture was shaken with successive 25 to 35 milliliter portions of ethyl ether until the ether was no longer colored by the sulfonated wood tar solution. Aqueous sodium hydroxide, 10 per cent solution, was then used to neutralize the sulfonated wood tar solution. Sufficient of the alkali was added so that a total of 10 grams of sodium hydroxide was added to the wood tar sulfonate. The solution was then made up to 100 grams total weight.

*Example III.*—A mixture of two grams of settled wood tar and 2 milliliters of acetic anhydride was refluxed for 3½ hours in order to acetylate any phenolic hydroxyl groups present in the tar. The acetylated wood tar was treated with 1.7 milliliters of chlorosulfonic acid, the mixture being cooled in ice-water during addition of the chlorosulfonic acid. Then 20 milliliters of water was added, with cooling. The cold mixture was shaken with successive 25 to 35 milliliter portions of ethyl ether until the ether was no longer colored by the sulfonated wood tar solution. The sulfonated wood tar solution was made just alkaline with 10 per cent aqueous sodium hydroxide. More sodium hydroxide was added, so that a total of 10 grams of sodium hydroxide was added in addition to that required to react with 2 cubic centimeters of acetic anhydride. The solution was then made up to 100 grams total weight, and refluxed for approximately two hours to complete hydrolysis of the acetylated material.

Each of the sodium wood tar sulfonate solutions prepared in accordance with the examples was tested for its effectiveness in air-oxidation treatments by using it in the treatment of Stoddard solvent containing n-butyl mercaptan. For this purpose, n-butyl mercaptan was dissolved in Midland Stoddard solvent having a boiling range of 304° to 405° C., so that a total of 0.005 per cent by weight of mercaptan sulfur was present in the solution. Samples of this sour Stoddard solvent (150 milliliters) were shaken mechanically in pint bottles for 15 minute periods with 15 milliliters of the treating solution, the vapor space being flushed with air between periods. The Stoddard solvent was tested with doctor solution at the end of each fifteen-minute shaking period.

In any sweetening process, the essential operation to be carried out is to develop reaction between the mercaptan sulfur and the reagent added to convert the sulfur to an innocuous form. Since the mercaptan is always present in hydrocarbons in quite small concentrations, it is necessary to bring about intimate contact between the treating solution and the mercaptan. The time required for sweetening will always vary with the apparatus and the technique used for contacting the hydrocarbon and the treating solution. Thus, in the evaluation of the process, time required for obtaining the sweet product is only a secondary criterion.

The following table summarizes in detail a few tests made in accordance with the procedure described in the example to show the comparative effectiveness of wood tar and sulfonated wood tar as a catalytic agent.

TABLE

*Relative effectiveness of alkali solutions of wood tar and sulfonated wood tar catalyst in the air-oxidation sweetening of Stoddard solvent containing 0.005% mercaptan sulfur as n-butyl mercaptan*

Formula for treating solution used:

| | Per cent by weight |
|---|---|
| Sodium hydroxide | 10 |
| Catalyst | 2 |
| Water | 88 |

| Catalyst Used | Total Treating Time Required For Sweetening of the Stoddard Solvent (min.) | Doctor Test | NPA Color | Saybolt Color |
|---|---|---|---|---|
| (Untreated Stoddard solvent containing 0.005% mercaptan sulfur.) | | Positive | | +25 |
| *Series I* (Sulfonates prepared with sulfuric acid): | | | | |
| (No catalyst used) | 435 | Negative | | +25 |
| Settled Wood Tar | 15 | do | | |
| Sodium "Wood Tar" Sulfonate | 315 | do | 1+ | +21 |
| Wood Tar Filtrate | 15 | do | | |
| Sodium "Wood Tar Filtrate" Sulfonate | 345 | do | 1+ | +13 |
| Wood Tar Solids | 30 | Borderline Negative | | −2 |
| Sodium "Wood Tar Solids" Sulfonate | 345 | Negative | | +19 |
| *Series II* (Sulfonates prepared with chlorosulfonic acid): | | Borderline Negative | | |
| Settled Wood Tar | 30 | Negative | 1+ | |
| Sodium "Wood Tar" Sulfonate [1] | 90 | do | | +21 |
| Sodium "Wood Tar" Sulfonate (phenolic hydroxyl groups protected by acetylation before sulfonation) | 45 | do | | +21 |

[1] Quantity of catalyst used in the treating solution formula corresponded to 2 grams of the unsulfonated settled wood tar.

In the table, colors have been stated in terms of the NPA and Saybolt scales, two widely used standards in petroleum technology. The NPA scale measures deep colors, the intensity of which is indicated by increasingly high numbers. In corresponding fashion, the Saybolt scale measures light colors and indicates their approach to water-whiteness by an increase in the number. Water-whiteness in the Saybolt scale is indicated by a value of about +25.

Results summarized in the table show that chlorosulfonic acid is a preferable sulfonating agent for the wood tar, as reference to the examples shown in test Series II will indicate. It produces a sulfonated wood tar which is a fast acting catalyst and one which gives a hydrocarbon product of little color. Although as a catalyst sulfonated wood tar is not as fast acting as the unsulfonated wood tar for the air-oxidation sweetening of sour hydrocarbon liquids, the sulfonated wood tar is superior to the unsulfonated wood tar because the hydrocarbon product shows substantially less color deterioration after a sweetening operation with the sulfonated wood tar.

As a sulfonating agent, chlorosulfonic acid is superior to sulfuric acid from the standpoint of retention of catalyst strength for the air-oxidation operations. This is apparently due to the fact that there is less destruction of active ingredients in the wood tar when chlorosulfonic acid is used as the sulfonating agent. The sulfonated wood tar is best prepared by protecting the phenolic hydroxy groups occurring in the wood tar components by acetylation before carrying out the sulfonation reaction. To obtain an active product, the acetyl groups are removed by refluxing the sulfonate with sodium hydroxide solution.

In each test, contact of the treating solution and the hydrocarbon was maintained until the hydrocarbon became sweet. It is to be observed that the aeration process for sweetening hydrocarbons, as a practical matter, is limited to those hydrocarbons which have a relatively low mercaptan sulfur content and are close to being sweet in any case. Thus, the samples treated contained 0.005 per cent of mercaptan sulfur. The efficacy of the process is measured not primarily by the length of time required to accomplish sweetening, but by the appearance of the product which has finally been rendered sweet. Any process which will accomplish the sweetening within a reasonable period, which may be as high as 5 or 6 hours, will be useful, provided it gives a product which approaches water-whiteness. Examination of the results shown in the table indicates that wood tar alone, Test No. 1, when contacted with a hydrocarbon containing mercaptan sulfur in the amount of 0.005 per cent causes the product to become sweet within a period of about 15 minutes of aeration. However, the color of the product is such as to vitiate substantially its commercial value, for as noted in the test reported, its color on the NPA scale was 1 plus. For comparison, the same wood tar, Test No. 2, in sulfonated condition was substantially slower, but not impracticably slow in developing a sweet product, and displayed the distinct advantage that the product obtained was substantially water-white as shown by the color index of 21 plus on the Saybolt scale.

Tests 4 and 5 made with wood tar filtrate yielded substantially similar results.

Tests 6 and 7 also provide comparative figures for wood tar solids and sulfonated wood tar solids.

Tests 8, 9 and 10 show that the catalytic activity of wood tar can be substantially preserved by employing a mild sulfonating agent or by taking precautions to protect hydroxy groups in compounds found in the wood tar.

From the table, it appears evident that sulfonated wood tar fractions, although they are slower than the corresponding unsulfonated wood tar fractions in converting mercaptans to disulfides, render a hydrocarbon sweet, and, also, possess the decided advantage that the color of the product taken from the process approaches water-whiteness quite uniformly. On the other hand, other colors developed in hydrocarbons by the unsulfonated catalysts are such as almost to render the product, though sweet, of doubtful commercial value. Thus, the process by employing sulfonated catalysts turns from the production of discolored products to competitive water-white products.

The treating solution can be re-used many times over for the catalyst is stable and substantially only mechanical losses need to be corrected. After a sweetening operation, the used solution is passed to a regenerator where it is heated, aerated and purged of mercaptans and organic sulfides which have carried over. If its composition has changed from the preferred range, either by reaction of ingredients or mechanical loss, it is readily adjusted at the regeneration stage.

Though the process has been described with a limited number of examples, it should be understood that they are to be interpreted as illustrative and not in a limiting sense.

What is claimed is:

1. The method of sweetening substantially water-white hydrocarbon liquids containing mercaptans comprising, agitating the liquid to be sweetened with an aqueous alkali metal hydroxide solution containing as a catalyst a small amount of sulfonated wood tar sufficient to accelerate oxidation of sulfur compounds in the hydrocarbon, aerating the mixture and separating from the mixture the sweetened hydrocarbon liquid.

2. The method of oxidizing mercaptans contained in substantially water-white petroleum hydrocarbon liquids to polysulfides comprising, agitating the hydrocarbon containing the mercaptan with an aqueous alkali metal hydroxide solution containing as a catalyst a small amount of sulfonted wood tar sufficient to accelerate oxidation of sulfur compounds in the hydrocarbon, aerating the mixture and separating from the mixture the sweetened hydrocarbon liquid.

3. The method of oxidizing mercaptans contained in substantially water-white petroleum hydrocarbon liquids to polysulfides comprising, agitating the hydrocarbon containing the mercaptan with an aqueous alkali metal hydroxide solution containing about 5 to 40 per cent of alkali metal hydroxide and as a catalyst about 0.5 to 5 per cent of sulfonated wood tar, sufficient to accelerate oxidation of sulfur compounds in the hydrocarbon, aerating the mixture and separating from the mixture the sweetened hydrocarbon liquid.

4. The method in accordance with claim 3 in which the alkaline solution contains about 5 to about 40 per cent of alkali and about 0.5 to about 5 per cent of a sulfonate of wood tar, said wood tar having a boiling range of about 240° to 300° C.

5. The method in accordance with claim 3 in which the catalyst is sulfonated wood tar liquid.

6. The method in accordance with claim 3 in which the catalyst is sulfonated wood tar solid.

GEORGE W. AYERS.
ERSKINE E. HARTON.

REFERENCES CITED

The following references are of record in the file of this patent:

UNITED STATES PATENTS

| Number | Name | Date |
|---|---|---|
| 2,364,582 | Davis et al. | Dec. 5, 1944 |
| 2,394,652 | Alves et al. | Feb. 12, 1946 |
| 2,427,212 | Henderson et al. | Sept. 9, 1947 |
| 2,427,250 | Bond | Sept. 9, 1947 |
| 2,464,576 | Hibbard et al. | Mar. 15, 1949 |